Patented Jan. 21, 1941

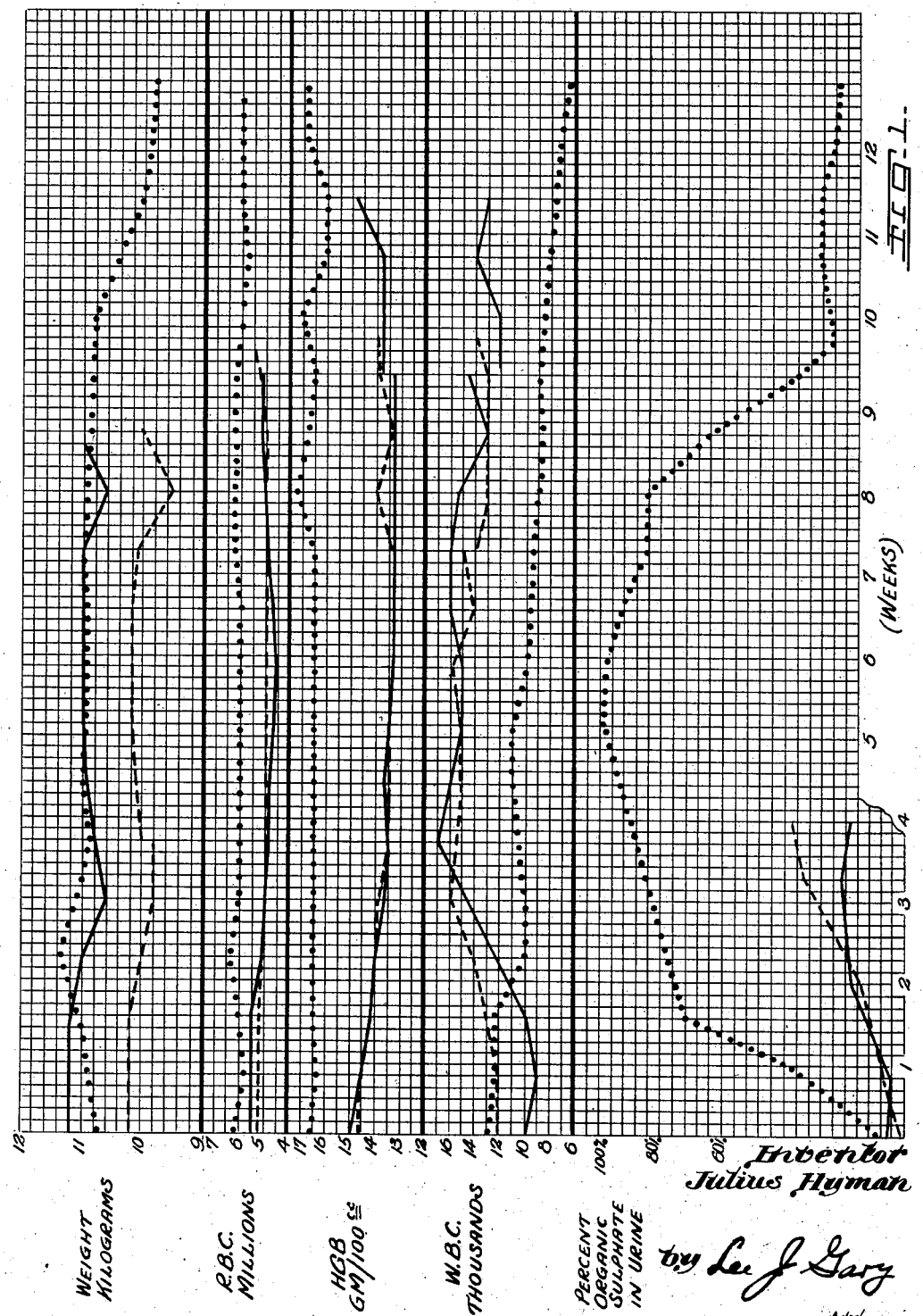

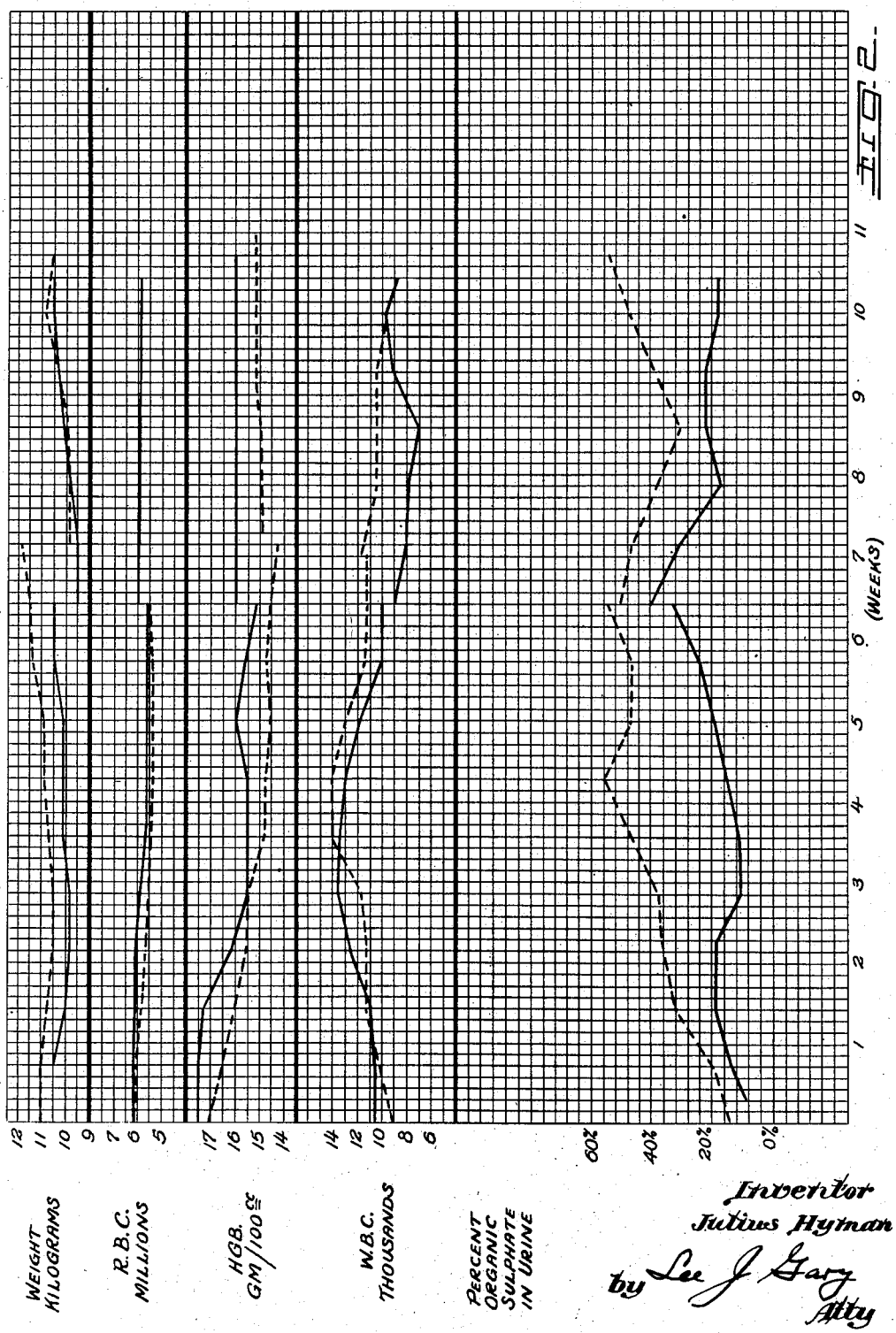

2,229,328

UNITED STATES PATENT OFFICE 2,229,328

NITROCELLULOSE LACQUER

Julius Hyman, Chicago, Ill., assignor to Velsicol Corporation, Chicago, Ill., a corporation of Illinois Application September 8, 1938, Serial No. 228,934

5 Claims. (Cl. 134—79)

This invention relates to new and useful mixtures containing benzol, and refers particularly to such mixtures wherein the inherent toxic effects of the benzol have been sharply reduced.

Benzol (benzene) is the simplest of the aromatic hydrocarbons, having the empirical formula, C6H6, and boiling at 176° F. It properties as a resin solvent and lacquer diluent have long been known. It is well established and recognized in the art that benzol, when used in appropriate formulations, is superior to all other hydrocarbons as a lacquer diluent, because of its high volatility combined with its excellent diluting value. Of recent years, however, the use of benzol as a lacquer diluent has been discouraged, chiefly because of its very marked toxicity. It acts as a poison on the human system and produces acute and chronic symptoms by damaging the white blood cell-producing mechanism, thus often gives rise to serious leucopenias and other grave hematological abnormalities in those individuals constantly exposed to its vapors. Hence, in its place have been substituted toluol and certain low-boiling petroleum fractions of high aromatic or hydroaromatic content. Not only are these substitutes higher in price than benzol, but for the purpose intended they are inferior to benzol in dilution value and evaporation rate. Nevertheless, because they are definitely less toxic than benzol, these higher priced and relatively inferior hydrocarbons are at present the only lacquer diluents in general use.

The United States Public Health Service has assumed that all solvent mixtures containing 15% or more of benzol are sufficiently toxic to require an especial warning stamped on the package or sales invoice.

It is an object of this invention to permit the utilization of benzol, in blends of 15% or more in other solvents or diluents, as a resin solvent and lacquer diluent, and for other like purposes where persons may be subjected to its vapors, without its usual dangerous and injurious effects, and to render it at least no more toxic than accepted but inferior substitutes.

It is a further object of this invention to provide mixtures, comprising essentially benzol, which retain the widely recognized superior qualities of benzol for the formulation and handling of lacquers, varnishes and the like, which mixtures are superior in at least these respects to toluol, yet the harmful effects of which on the animal organism are of the same order of magnitude as those of toluol.

A further object relates to the economy of materials and the utilization of an inexpensive but hitherto dangerous solvent, for while the use of benzol in commerce is being more and more restricted to the blending motor fuel field, I enable its scope of usefulness to be considerably broadened and to re-establish it in an industry which has a great demand and desire for its useful properties.

When benzol per se, is absorbed in the animal organism, it appears to be detoxified largely by conjugation with sulphuric acid, and then to be excreted in the urine. Toluol, on the other hand, seems to be detoxified only secondarily by this means. Experiments which I have instigated indicate that the highly toxic effects of benzol become evident only when the sulphuric acid conjugating activity of the organism is over-taxed. Further, these experiments have demonstrated that the toxic manifestations of benzol are either reduced or augmented if the benzol or benzol vapor is admixed with other solvents possessing boiling ranges higher or lower than benzol. For example, mixtures of benzol with solvents, especially hydrocarbon solvents, boiling at lower temperatures than the boiling point of benzol (176° F.) are definitely more toxic than is benzol itself. On the other hand, benzol in admixture with higher boiling solvents acts definitely less toxic than does benzol alone. This reduction in toxicity is so striking that it is possible to prepare fractions of hydrocarbon solvents containing very appreciable quantities of benzol, which nevertheless show toxic manifestations no more severe than those of commercial toluol.

For example, a hydrocarbon mixture (a product of high-temperature gas polymerization) comprising approximately three-fourths benzol, the remainder being largely lighter hydrocarbons, whose distillation characteristic (Engler) was as follows:

| | °F. |
|---|---|
| Initial boiling point | 120 |
| 10% | 164 |
| 50% | 173 |
| 90% | 175 |
| End boiling point | 186 | showed itself in a series of ingestion experiments on dogs to be considerably more toxic than commercial (nitration) benzol.

Conversely, a hydrocarbon mixture, marketed commercially as Velsicol solvent No. 2, produced in accordance with my invention by the pyrolytic treatment of hydrocarbon gases, containing by volume approximately three-fifths benzol, one-third toluol and the remainder largely heavier aromatic compounds, whose distillation characteristic (Engler) was as follows:

|  | °F. |
|---|---|
| Initial boiling point | 178 |
| 10% | 183 |
| 50% | 190 |
| 90% | 227 |
| End boiling point | 270 | showed itself in experiments on dogs (both ingestion and inhalation experiments) to be no more toxic than equal quantities of commercial toluol, and very much less toxic than equal quantities of benzol.

The graphs, Figures 1 (ingestion) and 2 (inhalation) illustrate the comparative toxic actions of benzol, (dotted lines), toluol (solid lines) and Velsicol solvent No. 2 (broken lines), taken over an extended period. Charted are the average weights, red blood cell count (R. B. C.), hemoglobin determination (HGB), white blood cell count (W. B. C.) and percent organic sulfate in the urine of the experimental animals (dogs).

The inhalation concentration was 0.1% by volume. In the ingestion experiments the dosages varied. The benzol dosages throughout was 0.2 gm. per kilogram body weight per day. The toluol and solvent No. 2 dosage for the first five weeks was 0.2 gm. per kilogram body weight per day. For the next two weeks the dosage was raised to 0.4 gm., while the dosage for the eighth week was 0.8 gm. Thereafter the dosage was maintained at 1.6 gms.

No significant distinction in toxicity between toluol and Velsicol solvent No. 2 could be observed on the experimental animals. This held true also on autopsy, both macroscopically and microscopically. The benzol animals, on the other hand, showed a definite decline toward the end of the experiment (see, especially, the course of the white blood cell count), and autopsies indicated liver damage. It was, furthermore, determined that dogs died rapidly if the dosage of benzol was increased.

As a result of my investigations I have found that the toxicity of benzol solutions is markedly reduced if the initial boiling point of the solvent mixture is above 176° F., while an initial boiling point not lower than 178° F., leaves a margin of safety. The 10% distillation point (Engler) of a benzol mixture should not be less than 180° F., or the 50% point not below 187° F., if the solvent is to replace toluol as a low-toxicity diluent.

This invention is especially applicable to the aromatic hydrocarbon product resulting from the pyrolysis of natural or refinery gases, for here the separation of pure hydrocarbons is difficult, because of the complexity of the product. As such products in virgin condition usually contain considerable quantities of unsaturates, which tend on standing to oxidize and form gum, it is well to polymerize such substances out of the crude solvent. The iodine number of a finished toluol substitute should not be over 20 (Wijs). It should be "doctor" sweet (passably mercaptan-free) and non-corrosive (passably sulfur-free).

The solvent power or dilution value of a benzol blend as measured by the conventional Kauri-Butanol method or by the nitrocellulose dilution ratio, will be a function of the materials blended with the benzol. Hydrocarbon blends of benzol and heavier hydrocarbon solvents can be prepared whose Kauri-Butanol values and whose dilution ratios may be equal to or greater than those of toluol.

The solvent action of benzol differs from its diluent action in that, in the former, the benzol acts as a true dissolving medium, whereas in the latter the benzol merely dilutes the true dissolving medium, for the purpose of lowering the cost of the mixture.

I claim as my invention:

1. A nitrocellulose lacquer containing a hydrocarbon diluent, said diluent containing at least 15% benzol and having an initial boiling point above 176° F., not more than 10% of said diluent boiling below 180° F., and not more than 50 thereof boiling below 187° F.

2. A nitrocellulose lacquer containing a hydrocarbon diluent, said diluent containing at least 15% benzol and having an initial boiling point above 176° F. and an iodine number under 20, not more than 10% of said diluent boiling below 180° F. and not more than 50% thereof boiling below 187° F.

3. A nitrocellulose lacquer containing a hydrocarbon diluent, said diluent containing a major portion of benzol by volume in admixture with higher boiling point hydrocarbons and having an initial boiling point above 176° F., not more than 10% of said diluent boiling below 180° F. and not more than 50% thereof boiling below 187° F.

4. A nitrocellulose lacquer containing a hydrocarbon diluent, said diluent containing by volume approximately three-fifths benzol, one-third toluol and the remainder largely heavier aromatic hydrocarbon and having an initial boiling point above 176° F., not more than 10% of said diluent boiling below 180° F., and not more than 50% thereof boiling below 187° F.

5. A nitrocellulose lacquer containing a hydrocarbon diluent resulting from the pyrolytic treatment of hydrocarbon gases, said diluent containing at least 15% benzol, having an initial boiling point above 176° F. and a toxicity characteristic substantially less than that of benzol, not more than 10% of said diluent boiling below 180° F. and not more than 50% thereof boiling below 187° F.

JULIUS HYMAN.